No. 728,817. PATENTED MAY 19, 1903.
J. E. WOODBRIDGE.
STARTING ALTERNATING CURRENT MACHINES.
APPLICATION FILED OCT. 11, 1901.
NO MODEL.
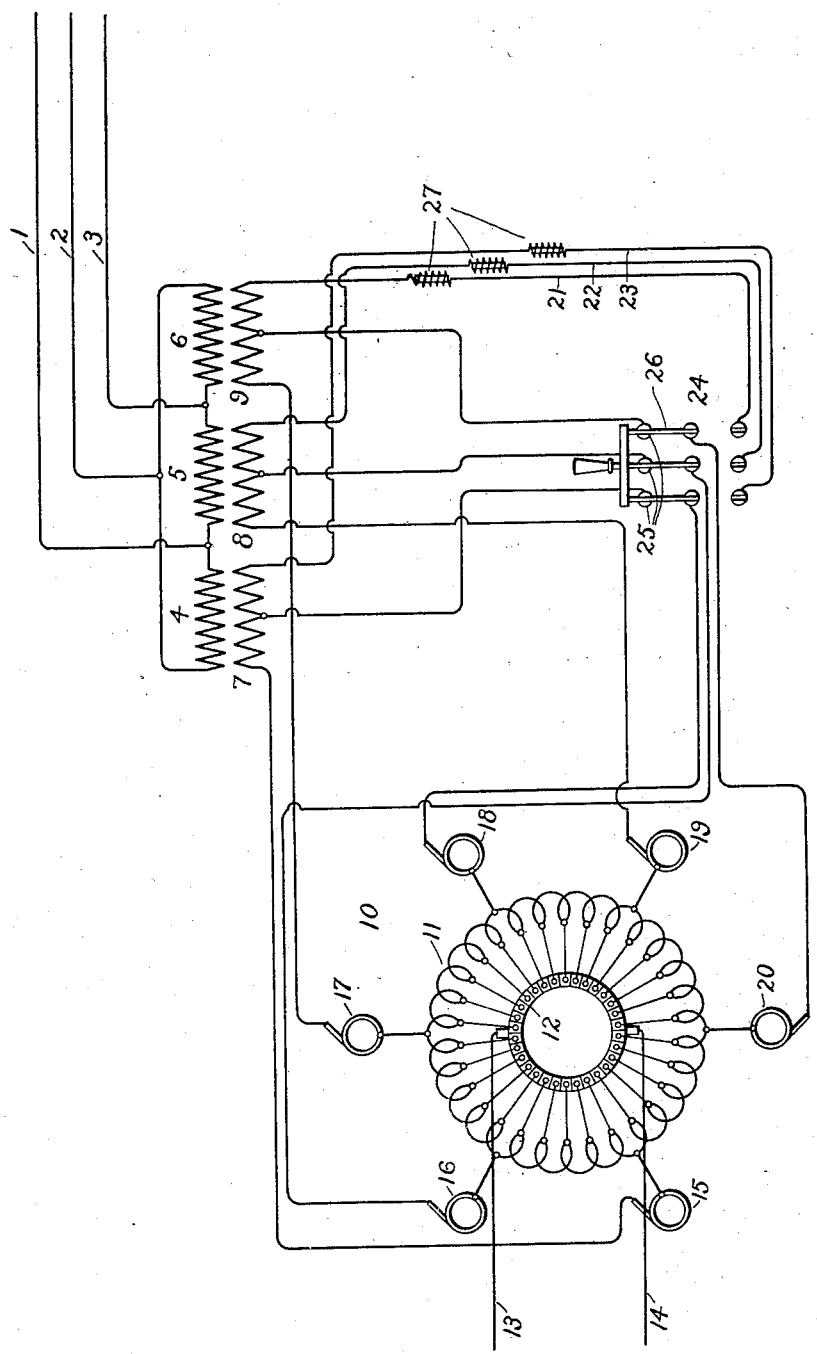
Witnesses.
John Ellis Glenn.
Benjamin B. Hull.
Inventor:
Jonathan E. Woodbridge.
by Albert G. Davis
Atty.

No. 728,817. Patented May 19, 1903.

UNITED STATES PATENT OFFICE.

JONATHAN E. WOODBRIDGE, OF SCHENECTADY, NEW YORK, ASSIGNOR TO GENERAL ELECTRIC COMPANY, A CORPORATION OF NEW YORK.

STARTING ALTERNATING-CURRENT MACHINES.

SPECIFICATION forming part of Letters Patent No. 728,817, dated May 19, 1903.

Application filed October 11, 1901. Serial No. 78,287. (No model.)

*To all whom it may concern:*

Be it known that I, JONATHAN E. WOODBRIDGE, a citizen of the United States, residing at Schenectady, county of Schenectady, State of New York, have invented certain new and useful Improvements in Starting Alternating-Current Machines, of which the following is a specification.

My present invention relates to means for starting alternating-current machines—such, for example, as rotary converters, synchronous motors, or the like—and particularly those adapted to operate with multiphase currents.

The novel features which characterize my invention I have particularly pointed out in the appended claims.

For a better understanding of the invention itself and of the details of its practical application reference is to be had to the following description, taken in connection with the accompanying drawing, which illustrates one embodiment of my invention.

In starting rotary converters or synchronous motors by alternating currents it is frequently necessary to reduce the normal electromotive force before impressing the same upon the machine, thereby avoiding excessive starting-currents which would otherwise result. My invention comprises a novel means for supplying current of reduced electromotive force.

In the drawing the lines 1 2 3 represent the mains of a three-phase supply system. Connected to these mains are the primary windings 4 5 6 of three transformers, these primary windings being joined, as indicated, in delta relation to each other. The secondary windings are represented, respectively, at 7, 8, and 9 and are arranged to supply current to a six-phase rotary converter 10. This rotary converter is provided in the usual manner with an armature-winding 11, to which is connected a commutator 12, upon which bear brushes for conveying current to the direct-current leads 13 14. The collector-rings of the rotary converter are of course six in number and are represented at 15 to 20, inclusive. The three alternate collector-rings 15, 19, and 17 are directly connected, respectively, to one end of each of the secondary windings 7, 8, and 9. The other ends of the windings are connected, through leads 21, 22, and 23, including the reactive coils 27 usually employed for phase control, to a set of fixed contacts forming a portion of a switching mechanism 24. An intermediate point in each of the windings is also connected, through a corresponding lead, to one of another set of fixed contacts 25. A three-bladed switch 26 has its respective blades connected with the remaining collector-rings 18, 16, and 20 of the rotary converter and by being thrown to its upward position, as represented in the drawing, serves to connect the said collector-rings directly to the respective intermediate points of the secondary windings 7, 8, and 9 without the interposition of reactive coils. When thrown into its opposite position, it connects these collector-rings, through the leads 21, 22, and 23 and the reactive coils 27, with the outside terminals of the said windings. In the latter position, therefore, maximum voltage is impressed upon the rotary converter and corresponds to the connections of the apparatus while in normal running order. In starting the switch is thrown to its upper position, as indicated in the drawing, and thereby causes reduced electromotive forces to be impressed upon the rotary converter, thereby preventing the occurrence of too large starting-currents. Owing to the fact that the reactive coils are out of circuit in this position, such electromotive forces as are produced by the secondaries of the transformers are usefully employed in starting the rotary converter and not consumed in part in the leads, as would be the case were the reactive coils in circuit. In the middle position of the switch the alternating-current circuits of the rotary converter are of course untraversed by current.

What I claim as new, and desire to secure by Letters Patent of the United States, is—

1. The combination of windings constituting sources of current, leads extending from said windings, reactive coils in circuit with some only of said leads, a dynamo-electric machine, and a switching mechanism for connecting to said machine either leads including said reactive coils or leads not including said reactive coils.

2. The combination of an alternating-current dynamo-electric machine provided with an even number of alternating-current leads, windings constituting sources of current, permanent connections between a portion of said leads and terminals of said windings, reactive coils and a switch arranged so that when thrown into one position it connects the remaining leads to said windings directly, and when thrown into another position it connects the said remaining leads to said windings through said reactive coils.

3. The combination of windings constituting sources of current, a dynamo-electric machine, reactive coils, means for connecting either less than the whole length of said windings directly to said dynamo-electric machine or for connecting the whole length of said windings through said reactive coils to said dynamo-electric machine.

4. The combination of a six-phase rotary converter, three windings constituting sources of alternating current, a permanent connection between one terminal of each of said windings and a collector-ring of said rotary converter, reactive coils and means for connecting the remaining collector-rings of the rotary converter either directly to intermediate points in said windings or to the remaining terminals of said windings through said reactive coils.

In witness whereof I have hereunto set my hand on this 8th day of October, 1901.

JONATHAN E. WOODBRIDGE.

Witnesses:
BENJAMIN B. HULL,
HELEN ORFORD.